UNITED STATES PATENT OFFICE 2,448,531

RESINOUS COPOLYMER OF ISOPROPENYL ACETATE

William O. Kenyon and Cornelius C. Unruh, Rochester, N. Y., assignors to Eastman Kodak Company, Rochester, N. Y., a corporation of New Jersey No Drawing. Application July 23, 1943, Serial No. 495,888

16 Claims. (Cl. 260—78.5)

This invention relates to resinous copolymers of isopropenyl acetate and to a process for preparing the same.

It is known that polymerizable vinyl compounds, especially vinyl esters and styrene, can be copolymerized with esters of unsaturated dibasic acids, such as esters of maleic, fumaric, citraconic and mesaconic acids, to give resinous copolymers useful in the manufacture of coating compositions. Such resinous copolymers are rather brittle and not well suited for molding purposes.

We have now found that isopropenyl acetate (1-propen-2-ol acetate) which is neither polymerizable to high molecular weight resinous forms, nor contains a vinyl group, can be copolymerized with esters of maleic and fumaric acids to give resinous copolymers which in the case of the normal esters, especially normal esters of fumaric acid, are unusually well suited for the manufacture of molded products. Unlike vinyl acetate and styrene, isopropenyl acetate cannot be copolymerized with esters of mesaconic or citraconic acids to give high molecular weight resins.

It is, accordingly, an object of our invention to provide new resinous copolymers. A further object is to provide a process for preparing such resinous copolymers. A still further object is to provide molded products of such resinous copolymers and a process for preparing such molded products. Other objects will become apparent hereinafter.

In accordance with our invention, we copolymerize isopropenyl acetate with an ester of maleic acid or an ester of fumaric acid. Normal i. e. diesters, are advantageously employed. Normal esters of maleic acid can be represented by the following general formula:

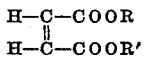

wherein R and R' each represent an alcohol radical. Normal esters of fumaric acid can be represented by the following general formula:

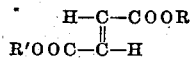

wherein R and R' each represent an alcohol radical. In acid or monoesters (as contrasted with normal esters) one of the R groups in the above formulas is a hydrogen atom. Isopropenyl acetate can be represented by the following formula:

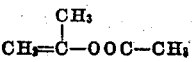

The copolymerization of isopropenyl acetate with esters of maleic and/or fumaric acids is accelerated by heat, and by the polymerization catalysts which are known to accelerate the polymerization of vinyl and acrylic compounds. Exemplary of such catalysts are the organic peroxides (e. g. benzoyl peroxide, acetyl peroxide and lauroyl peroxide), hydrogen peroxide, perborates (e. g. alkali metal perborates) and persulfates (e. g. alkali metal persulfates).

The copolymerizations can be effected with or without a diluent. The diluent, if employed, is advantageously a solvent for the copolymer. The monomers can also be emulsified in a liquid in which they are insoluble (e. g. water) and the emulsion subjected to polymerization.

As normal esters of maleic and fumaric acids, symmetrical or unsymmetrical esters can be employed, e. g. diethyl fumarate or ethyl butyl fumarate. The dialkyl maleates and fumarates in which each alkyl group has the formula $C_nH_{2n+1}$ wherein $n$ represents a positive integer of from one to three, give copolymers of particular utility for molding purposes.

Not only esters in which the alcohol radical is $C_nH_{2n+1}$ wherein $n$ represents a positive integer can be used, but esters containing substituted alcohol radicals can also be employed in practicing our invention, as can esters containing unsaturated and cyclic alcohol radicals. Thus, there can be employed to copolymerize with isopropenyl acetate, such esters as di-($\beta$-chloroethyl)-fumarate, di-($\beta$-ethoxyethyl)-fumarate, di-($\beta$-cyanoethyl)-fumarate, dicyclohexyl fumarate or diallyl fumarate.

More than one ester of maleic or fumaric acid can be copolymerized with isopropenyl acetate, i. e. two or more maleic esters can be copolymerized with isopropenyl acetate, two or more fumaric esters or a maleic and a fumaric ester can be copolymerized with isopropenyl acetate simultaneously. Moreover, the copolymerization of the isopropenyl acetate with the maleic or fumaric esters can be carried out in the presence of some other unsaturated polymerizable compound, e. g. vinyl acetate, styrene, methyl $\alpha$-methacrylate or methyl isopropenyl ketone.

The following examples will serve to illustrate our new resinous copolymers and the manner of obtaining the same.

*Example I.—Copolymer of isopropenyl acetate and dimethyl maleate*

10.0 grams of isopropenyl acetate, 14.4 grams of dimethyl maleate and 0.122 gram of benzoyl peroxide were sealed in a glass tube and the tube placed in a constant temperature bath of 50° C. After 9 days the tube was opened and the colorless, hard and brilliantly clear resin was dissolved in acetone to give a viscous solution, which was poured into a large excess of absolute alcohol. The white precipitate was dried at 60° C. 18 grams of resin were obtained showing on analysis 18.5% of acetyl by distillation. Its specific viscosity in acetone was 0.043 and possessed a sticking point of 201° C. The analysis corresponds to 43% of isopropenyl acetate and 57% of maleic ester (by diff.) or a 1.09/1 ratio of monomers.

*Example II.—Copolymer of isopropenyl acetate and diethyl maleate*

50.0 grams of isopropenyl acetate, 86 grams of diethylmaleate and 0.68 gram of benzoyl peroxide were sealed together in a glass tube, and the tube placed in a constant temperature bath of 50° C. After 15 days the tube was opened, the product being a hard, colorless and brilliantly clear resin. This was dissolved in acetone to give a viscous dope which was filtered. The filtrate was precipitated into a large excess of agitated Skellysolve G (consisting essentially of low-boiling hydrocarbons). The soft white precipitate was again dissolved in acetone to give a thin freeflowing dope. This solution was poured slowly into agitated warm water. The fibrous resin was drained and dried at 60° C. The yield of resin was 114 g. with a sticking point of 146° C. and specific viscosity in acetone of 0.038. Determination of acetyl by distillation gives 15.0%. This corresponds to 35% of isopropenyl acetate and 65% (by diff.) of maleic ester or a molar ratio of 1:1.08.

*Example III.—Copolymer of isopropenyl acetate and di-n-propyl maleate*

50.0 grams of isopropenyl acetate, 100.0 grams of di-n-propyl maleate and 0.75 gram of benzoyl peroxide were sealed together in a glass tube and the tube placed in a constant temperature bath of 50° C. After 15 days the tube was opened and the hard, clear and colorless resin was dissolved in acetone, and this colorless, viscous solution was precipitated into a large excess of Skellysolve G. This soft white precipitate was again dissolved in acetone to give a thin dope. This solution was precipitated into warm water that was being constantly agitated. The white precipitate was dried at 60° C.

The resin, on analysis, showed an acetyl content of 14.2%. Its specific viscosity was 0.086 and had a sticking point of 138° C. The acetyl analysis corresponds to 33% of isopropenyl acetate and 67% of fumaric ester by difference. This is almost an equimolar ratio.

*Example IV.—Copolymer of isopropenyl acetate and di-n-butyl maleate*

50.0 grams of isopropenyl acetate, 114.0 grams of di-n-butyl maleate and 0.82 gram of benzoyl peroxide were sealed together in a glass tube, and the tube placed in a constant temperature bath of 50° C. After 15 days the tube was opened and the clear and colorless resin, very slightly soft, was dissolved in acetone to give a viscous colorless dope which was filtered. The filtrate was poured slowly into a large excess of stirred Skellysolve G. This soft white precipitate was again dissolved in acetone to give a thin dope this time, and this solution was poured slowly into a large excess of warm water that was constantly agitated. The white precipitate was drained off and dried at 60° C. Yield 110 g. It showed an acetyl content of 14.6%, and in acetone solution had a specific viscosity of 0.044. The sticking point of the resin was 104° C. This analysis is equivalent to 34% of isopropenyl acetate, or a ratio of 0.85 mole of fumaric ester/mole isopropenyl acetate.

*Example V.—Copolymer of isopropenyl acetate and di-(β-chloroallyl) fumarate*

10.0 grams of isopropenyl acetate, 26.5 grams of di-(β-chloroallyl) fumarate and 0.183 gram benzoyl peroxide were sealed together in a glass tube and the tube placed in a 50° C. constant temperature bath. After 3 days a hard, clear and slightly yellow resin was formed. It was found to be insoluble but swelled in acetone. The chlorine content was found to be 21.42%.

*Example VI.—Copolymer of isopropenyl acetate and dimethyl fumarate*

A solution of 33.0 grams of isopropenyl acetate, 50.0 grams of dimethyl fumarate and 0.415 gram of benzoyl peroxide in 200 cc. of acetone were refluxed for 10 days. The product was poured slowly into a large excess of agitated absolute alcohol, and the brittle white resin was washed in several changes of fresh alcohol, then reprecipitated again from acetone solution into alcohol. Finally the product was redissolved in acetone and precipitated into warm water. 44.5 grams of product were obtained which analyzed for 14.5% acetyl by distillation.

*Example VII.—Copolymer of isopropenyl acetate and diethyl fumarate*

10.0 grams of isopropenyl acetate, 17.2 grams of diethyl fumarate and 0.136 gram benzoyl peroxide were sealed together in a glass tube and placed in a constant temperature bath of 50° C. After a period of 10 days the tube was opened and the product, a clear, colorless and hard resin, was dissolved in acetone to give a colorless, viscous solution which was filtered. This filtrate was precipitated into absolute alcohol, and the soft white precipitate was redissolved in acetone. This thinly viscous solution was poured slowly into hot water that was in constant agitation. The white fibrous precipitate was pressed free of water and dried at 50–60° C. Yield 23 grams.

Analysis of the above product showed that it contained an ethoxyl content of 35.0%. Elementary analysis showed a carbon content of 56.63% and a hydrogen content of 7.14%. Hydrolysis of a weighed sample with strong alkali, then acidified with phosphoric acid and the volatile acids distilled showed that the original resin had an acetyl content of 13.7%. The specific viscosity of the resin was 0.100 and had a sticking point of 175° C. From the acetyl and alkoxyl analyses the resin contains 32% and 67% of isopropenyl acetate and diethyl fumarate respectively. This corresponds to 1.2 moles of fumaric ester to each mole of isopropenyl acetate.

*Example VIII.—Copolymers of isopropenyl acetate and diethyl fumarate*

A series of copolymerizations between isopropenyl acetate and diethyl fumarate was run varying the proportion of the two components. Since the total weight of the two was the same in each case, the same amount of catalyst was used in each, namely 0.100 gram. A temperature of 50° C. was used throughout. After 7 days the tubes were opened and the clear and colorless resins were each doped in acetone, filtered and precipitated first in absolute alcohol, then redissolved in acetone and the solution precipitated into hot water as described in Example I. The following table shows the data obtained on the products:

| Isopropenyl Acetate | | Ethyl Fumarate | | Yield of Product | Acetyl by distillation | Sp. Vis. | Stick. Point |
|---|---|---|---|---|---|---|---|
| Grams | Moles | Grams | Moles | Grams | Percent | | °C. |
| 4.0 | .04 | 16.0 | .093 | .4 | 10.1 | 0.066 | |
| 6.0 | .06 | 14.0 | .081 | 16.7 | 12.6 | 0.083 | 149 |
| 8.0 | .08 | 12.0 | .070 | 16.6 | 14.2 | 0.088 | 140 |
| 10.0 | .10 | 10.0 | .058 | 13.8 | 14.8 | 0.095 | 157 |
| 12.0 | .12 | 8.0 | .047 | 11.5 | 15.2 | 0.088 | 163 |

*Example IX.—Copolymer of isopropenyl acetate and diethyl fumarate*

To a solution of 6.0 grams of an approximately 30% solution of Triton K-60 (a tetra-alkyl quaternary ammonium halide) in 500 cc. of distilled water was added a mixture of 129 g. of diethyl fumarate and 75 grams of isopropenyl acetate. 2 cc. of 30% hydrogen peroxide were added to the mixture. The flask was connected to a reflux condenser and heated on a steam bath. A slow current of nitrogen was maintained in the flask during the polymerization. After about 20 hours steam was bubbled through the emulsion to remove unreacted monomers.

25 cc. of a strong solution of Calgon (essentially sodium hexametaphosphate) was added to the emulsion and the precipitate was filtered off by suction. This precipitate was thoroughly washed with cold water to remove salts and then air-dried at room temperature. The yield was 110 grams. Its sticking point was 113° C. and its specific viscosity in acetone was 0.038.

*Example X.—Copolymer of isopropenyl acetate and diethyl fumarate*

10.0 grams of isopropenyl acetate, 17.2 grams of diethyl fumarate and 0.143 gram benzoyl peroxide were sealed in a glass tube and the tube subjected to the ultra-violet radiation of a "Uviarc" lamp for 100 hours. The tube was opened and the colorless clear and hard resin was dissolved in acetone and the resin purified as described in Example I. 20.0 grams of resin were obtained with a specific viscosity of 0.088 in acetone and a sticking point of 167° C. Acetyl by distillation showed an acetyl content of 12.7%.

*Example XI.—Copoylmer of isopropenyl acetate and diisopropyl fumarate*

50.0 grams of isopropenyl acetate, 100.0 grams of diisopropyl fumarate and 0.75 gram of benzoyl peroxide were sealed together in a glass tube and the tube placed in a constant temperature bath at 50° C. After 5 days the clear hard and colorless resin in the tube was removed and dissolved in acetone. The colorless viscous dope was filtered and the filtrate was poured slowly into a large excess of agitated Skellysolve G. The soft white resin was again dissolved in acetone and the free-flowing viscous solution was precipitated by pouring slowly into a large volume of warm water that was in constant agitation. The fibrous, white precipitate was pressed out and dried at 60° C. The yield of resin was 123 g. analyzing 11.4% acetyl by distillation. Its specific viscosity in acetone was 0.076 and its sticking point was found to be 170° C.

*Example XII.—Copolymer of isopropenyl acetate and diethyl fumarate*

10.0 grams isopropenyl acetate, 17.2 grams diethyl fumarate and 0.136 gram sodium perborate were sealed together in a glass tube and the tube placed in a constant temperature bath at 50° C. After 16 days the tube was opened and the hard, clear and colorless resin was purified in the manner described in Example I. The yield of product was 17.5 grams and analyzed 13.9% acetyl by distillation. Its specific viscosity in acetone was 0.112 and sticking point 167° C.

*Example XIII.—Copolymer of isopropenyl acetate and diethyl fumarate*

10.0 grams isopropenyl acetate, 17.2 grams diethyl fumarate and 0.136 gram acetyl peroxide were sealed together in a glass tube and the tube placed in a 50° C. constant temperature bath. After 16 days the tube was opened and the hard, clear and colorless resin was purified in the manner described in Example I. The yield of product was 22 grams and analyzed 14.4% acetyl by distillation. Its specific viscosity in acetone was 0.081 and its sticking point was 157° C.

*Example XIV.—Copolymer of isopropenyl acetate, diethyl fumarate and dimethyl fumarate*

20.0 grams isopropenyl acetate, 25.8 grams diethyl fumarate, 7.7 grams dimethyl fumarate and 0.267 gram benzoyl peroxide were sealed together in a glass tube and the tube placed in a constant temperature bath at 50° C. After 8 days the tube was opened and the clear and colorless, hard resin was dissolved in acetone. The colorless viscous dope was filtered and the filtrate was poured slowly into a large excess of stirred absolute ethyl alcohol and purified in the manner described in Example I. Analysis showed 14.9% acetyl by distillation. 46 grams of resin were obtained whose sticking point was 177° C. and whose specific viscosity in acetone was 0.083.

*Example XV.—Copolymer of isopropenyl acetate and di-n-butyl fumarate*

50.0 grams of isopropenyl acetate, 114.0 grams of di-n-butyl fumarate and 0.82 gram of benzoyl peroxide were sealed together in a glass tube and the tube was placed in a constant temperature bath at 50° C. After 5 days the tube was opened and the clear and colorless resin, very slightly soft, was dissolved in acetone to give a viscous dope. This was filtered and the filtrate was poured slowly into a large excess of agitated Skellysolve G. The soft white precipitate was again dissolved in acetone to give a thin dope. This solution was poured slowly into well agitated warm water. The precipitate was drained and dried at 60° C. 123 grams of resin were obtained whose specific viscosity in acetone was 0.086 and analysis for acetyl by distillation gave 11.90% as a result. The sticking point was 105° C.

*Example XVI.—Copolymer of isopropenyl acetate and di-n-hexyl fumarate*

10.0 g. of isopropenyl acetate, 28.4 grams of di-n-hexyl fumarate and 0.192 gram benzoyl peroxide were sealed together in a glass tube and the tube placed in a constant temperature bath at 50° C. After 17 days the tube was opened and the rubbery resin was dissolved in acetone to give a colorless solution. This was poured slowly into a large volume of agitated warm water. The precipitate was dried in vacuo at 55° C. Acetyl by distillation showed 10.5% acetyl, and specific viscosity in acetone was 0.034. Sticking point was 93° C.

*Example XVII.—Copolymer of isopropenyl acetate and di-(β-chloroethyl) fumarate*

10.0 grams of isopropenyl acetate, 24.1 grams of di-(β-chloroethyl) fumarate and 0.171 gram benzoyl peroxide were sealed together in a glass tube and the tube placed in a 50° C. constant temperature bath. After 3 days a hard, clear and colorless resin was formed. It was found to be insoluble but swelled in acetone. The chlorine content was found to be 22.6%.

*Example XVIII.—Copolymer of isopropenyl acetate and dibenzyl fumarate*

10.0 grams of isopropenyl acetate, 29.6 grams of dibenzyl fumarate and 0.198 gram of benzoyl peroxide were sealed together in a glass tube and the tube placed in a 50° C. constant temperature bath. After 9 days the tube was opened and the hard, clear and colorless resin was dissolved in enough acetone to give a viscous solution. This solution was poured into an excess of absolute alcohol and the precipitate washed in several changes of fresh alcohol and redissolved in acetone. This solution was poured into a large volume of warm water, the brittle white precipitate being dried at 55° C. The yield was 31 grams and the sticking point was found to be 123° C. Analysis showed 9.4% of acetyl by distillation.

*Example XIX.—Copolymer of isopropenyl acetate and di-β-(cyanoethyl) fumarate*

A solution of 5.0 grams of isopropenyl acetate, 11.1 grams of di-(β-cyanoethyl) fumarate and 0.160 gram of benzoyl peroxide in 25 cc. of acetone were refluxed for 2 days. The product was diluted with acetone to give a free-flowing viscous liquid which was poured into a large excess of absolute alcohol. The precipitate was washed in several changes of fresh alcohol and dried at 60° C. 13 grams of resin were obtained with a nitrogen content of 8.75%.

*Example XX.—Copolymer of isopropenyl acetate and monomethyl fumarate*

A solution of 20.0 grams of isopropenyl acetate, 26.0 grams of monomethyl fumarate and 0.230 gram of benzoyl peroxide in 75 cc. of acetone was refluxed for 4 days. The solution was poured into a large excess of distilled water and washed in numerous changes of distilled water and dried at 55° C. 22 grams of an alkali-soluble resin was thus isolated and showed 15.2% acetyl by distillation.

*Example XXI.—Copolymer of isopropenyl acetate and diethyl fumarate*

One gram of starch was triturated with a little water to form a paste and this was added to 200 cc. of hot water. To this was added 129 grams of diethyl fumarate, 75 grams of isopropenyl acetate, and 2.0 grams of benzoyl peroxide. This mixture contained in a one-liter, round-bottomed flask was placed in a 50° C. water bath and kept continually stirred under an atmosphere of nitrogen. After 2 days the polymer was present in the form of colorless and transparent beads which were washed thoroughly with cold water then dried for several days at room temperature. The yield was 192 grams. The copolymer contained 12.6% acetyl by distillation, had a specific viscosity of 0.081 and a softening point of 116° C.

*Example XXII.—Copolymer of isopropenyl acetate and ethyl-n-butyl fumarate*

10.0 grams of isopropenyl acetate, 20.0 grams of ethyl-n-butyl fumarate, and 0.15 gram of benzoyl peroxide were sealed together in a glass tube and placed in a 50° C. water bath. After one week the product was a clear, colorless, slightly soft resin which was dissolved in acetone. The solution was filtered and the filtrate poured into a large excess of Skellysolve G and the white precipitate was washed in fresh Skellysolve G. The precipitated copolymer was again dissolved in acetone and reprecipitated into hot water. The white fibrous precipitate was dried at 55° C., yielding 23.0 grams. The copolymer contained 13% acetyl by distillation and had a specific viscosity of 0.082.

*Example XXIII.—Copolymer of isopropenyl acetate and dicyclohexyl fumarate*

10.0 grams of isopropenyl acetate, 28.0 grams of dicyclohexyl fumarate, and 0.190 gram of benzoyl peroxide were sealed together in a glass tube and placed in a 70° C. water bath. After two days the product was a hard, clear and colorless resin which was dissolved in acetone. This solution was poured into a large excess of methanol and the white precipitate was leached overnight in fresh methanol. Thereupon it was dried at room temperature yielding 31.5 grams of product. The copolymer had a specific viscosity of 0.018.

*Example XXIV.—Copolymer of isopropenyl acetate and di(β-ethoxyethyl)-fumarate*

10.0 grams of isopropenyl acetate, 26.2 grams of di(β-ethoxyethyl) fumarate and 0.181 gram benzoyl peroxide were sealed together in a glass tube and placed in a 50° C. water bath. After 14 days, the product was a clear and colorless polymer which was dissolved in acetone. This solution was filtered and precipitated into a large excess of Skellysolve G. The white precipitate was redissolved in acetone and precipitated into warm water. The white precipitate was dried in vacuo at room temperature yielding 28 grams of product. The copolymer contained 13.6 per cent of acetyl by distillation and had a specific viscosity of 0.020.

*Example XXV.—Copolymer of isopropenyl acetate and di-(2-ethylhexyl)-fumarate*

10.0 grams of isopropenyl acetate, 32.8 grams of di(2-ethylhexyl) fumarate and 0.214 gram of benzoyl peroxide were sealed together in a glass tube and set in the 50° C. water bath. After 6 days, a clear and colorless, very viscous liquid was produced. This was thinned with acetone and the resulting solution precipitated into about 2 liters of methanol. The soft white precipitate was washed in fresh methanol to remove monomers then dried in vacuo at 55° C., to give 18.5 grams of product. The copolymer had a specific viscosity of 0.075.

In the foregoing examples, the resinous copolymers are prepared by heating, in the presence of a peroxide polymerization catalyst, a mixture of isopropenyl acetate and an ester selected from the group consisting of an ester of a monohydric alcohol and maleic acid and an ester of a monohydric alcohol and fumaric acid, the molecular ratio of isopropenyl acetate to said ester in said mixture being from 1:2.3 to 1:0.4. The molecular ratio of isopropenyl acetate to said ester in the copolymer is from 1:1.9 to 1:0.9.

Our new copolymers are especially valuable products for the purpose of molding. They can be molded by the usual compression or injection process, with or without plasticizers. Polymerization of the copolymers can be effected in molds so that the polymerized product has a definite shape. Solid masses of the copolymers can be worked by cutting, sawing, filing, etc. The copolymers can be worked into definite shapes by first softening with a suitable softening agent and then kneading, rolling, compressing or drawing the softened product. The copolymers can also be extruded into various shapes such as wires or films. The copolymers can also be transformed into useful films by making a solution of the copolymer and then casting the solution onto a film-forming surface such as a glass plate or a revolving drum, allowing the cast film to dry and then stripping the film from the surface. Solutions of our copolymer can also be extruded in a suitable form such as a fine thread into a drying atmosphere or into a precipitating bath.

Our new copolymers can be modified with plasticizers. Typical plasticizers are the following:

Benzyl phthalate
Benzyl succinate
Butoxyethyl tetra hydrofuroate
Cyclohexyl acetate
Diethylene glycol monobutyl ether
Diethylene glycol dibutyrate
Ethoxy ethyl adipate
Ethoxyethyl sebaccate
Ethylene glycol monobenzyl ether
Methoxyethyl phthalate
Tetrahydrofurfuryl adipate
Triacetin
Tripropionin
Triamyl phosphate
Tributyl phosphate
Triethylene glycol diacetate
Triphenyl phosphate
Camphor
Tribromo phenol Modifying agents, such as non-drying oils, drying oils, semi-drying oils, natural resins, synthetic resins, waxes, cellulose derivatives, such as cellulose acetate, pigments, fillers, dyes, etc. can be added to our copolymers. When suitably plasticized, our new copolymers can be employed as a laminating material for the preparation of safety glass. The softer copolymers are more suitable for this purpose.

When our copolymers are polymerized incompletely to give a syrupy mass, the mass is useful as an impregnating agent for porous substances, such as paper or textiles and also as a cement for cementing together surfaces such as the glass surfaces of lenses. These syrupy masses can be applied to various articles, such as set forth above and then subjected to a heat treatment in order to complete the polymerization.

The acetyl values given in the above examples were determined by dispersing a small sample of the copolymers in pyridine adding sodium hydroxide and heating the resulting mixture to saponifying the acetate groups in the copolymer. After saponification was complete, the saponification mixture was treated with an amount of phosphoric acid molecularly equal to the amount of sodium hydroxide originally added. The resulting mixture was then distilled in vacuo and the distillate which contained acetic acid corresponding to the acetate content of the copolymer was titrated with standard alkali.

Isopropenyl acetate can be prepared by the interaction of ketene with acetone, according to the method of Gwynn and Degering, Jour. Am. Chem. Soc., 64, 2216 (1942). Many of the maleic and fumaric esters are known substances. Examples of the preparation of those which were not heretofore described or which are not available on the market, are presented hereinafter.

*Example XXVI.—Di-(β-chloroallyl) fumarate*

98 grams of maleic anhydride, 370 grams β-chloroallyl alcohol, and 5 grams of p-toluene sulfonic acid were refluxed with stirring for 20 hours. The product was washed thoroughly with hot water then with sodium carbonate solution and finally again with water. The product was then dissolved in ether and the solution dried with anhydrous magnesium sulfate. The ether was thereupon evaporated off and the residual oil distilled under reduced pressure. The fraction boiling at 160° to 165° at 5 mm. of Hg pressure was cooled. The crystalline distillate was recrystallized from Skellysolve G. Melting point was 33 to 34° C.

*Example XXVII.—Di-(β-cyanoethyl) fumarate*

Five grams of p-toluene sulfonic acid and 2.5 mols of β-hydroxy propionitrile were warmed on steam bath, and to this was added 1 mole of maleic anhydride and 10 grams of ammonium chloride. When solution was complete, 6 grams of anhydrous zinc chloride were added and the mixture heated on the steam bath for 16 hours. The reaction product was washed with water, then with sodium bicarbonate solution and finally with water again. The insoluble portion was taken up in excess benzene. Excess solvent was distilled off until crystallization commenced whereupon the solution was chilled. The crystalline material was filtered off, recrystallized from benzene to give a product melting at 80–80.8° C.

*Example XXVIII.—Ethyl butyl fumarate*

196 grams of maleic anhydride and 148 grams of n-butyl alcohol were heated at 120° C. for 2 hours. On cooling, 240 grams of thionylchloride were added and the mixture heated on a steam bath until HCl evolution had nearly ceased. The product was filtered and the filtrate distilled under reduced pressure, the fraction boiling at 120–123° C. at 17 mm. being collected.

104 grams of the above mono-ester chloride were refluxed in 300 cc. of benzene containing 28 grams of ethyl alcohol for 3 hours. The benzene was distilled off and the residual oil was washed with water, followed by washing with sodium bicarbonate solution and again washing with water. The oil was taken up in ether and the solution dried with anhydrous magnesium sulfate. The ether was distilled off and the residue distilled under reduced pressure. The product was collected boiling at 102–103° C. at 4 mm. of Hg pressure.

*Example XXIX.—Di-cyclohexyl fumarate*

250 grams of maleic anhydride, 550 grams of cyclohexanol, 10 grams of p-toluene sulfonic acid and 20 grams of ammonium chloride were heated on a steam bath overnight. One liter of dry benzene was thereupon added and the mixture refluxed in such a manner that the water that was removed azeotropically could be collected returning the benzene to the still. When about 30 cc. of water had been collected the distillation was stopped. On cooling a crystalline mass separated from the benzene. This was separated and dissolved in ether, the solution being washed with water and sodium bicarbonate solution. The ether was thereupon distilled off and the residual oil distilled under reduced pressure, the fraction boiling at 183–188° C. at 55 mm. of Hg pressure.

The crystalline distillate was recrystallized from Skellysolve G using a little decolorizing charcoal. The product melted at 82° C.

Example XXX.—Dihexyl fumarate 300 grams of maleic anhydride, 918 grams hexanol, 30 grams of ammonium chloride, and 85 cc. of concentrated HCl were refluxed together for 30 hours. The product was washed with water, followed by washing with sodium bicarbonate solution, and finally washing with water again. The oil was taken up in ether and the solution dried over anhydrous magnesium sulfate.

The ether solution was filtered off, and distilled. After removal of ether the residual oil was fractionated under reduced pressure, removing first unreacted hexanol and the main fraction of the dihexyl fumarate boiling at 162–164° C. at 2 mm. of Hg pressure.

Example XXXI.—β-ethoxyethyl fumarate 180 grams of maleic anhydride, 356 grams of β-ethoxyethyl alcohol, 8 grams of p-toluene sulfonic acid, and 420 cc. of dry benzene were refluxed in refluxed in such a manner that the water formed in the reaction could be removed azeotropically, and the benzene returned to the still. The refluxing was continued until no more water appeared to be present in the condensing benzene. The excess benzene was distilled off, and the residue taken up in ether. This solution was washed with water, extracted with sodium bicarbonate solution, and again washed with water. The ether solution was dried over anhydrous magnesium sulfate.

The ether was thereupon removed from the solution and the residual oil distilled under reduced pressure, the fraction boiling at 179.5–180° C. at 15 mm. being collected.

Example XXXII.—Di-n-butyl fumarate 196 grams of maleic anhydride, 355.2 grams of n-butyl alcohol, 20 grams ammonium chloride and 8 grams of p-toluene sulfonic acid were heated on a steam bath for 48 hours with stirring. The product was washed with cold water, then taken up in ether. The ether solution was washed thoroughly with 10 per cent of sodium carbonate solution followed by washing with water. The solution was dried over anhydrous magnesium sulfate.

The dried solution was filtered and the ether distilled off the filtrate. The residual oil was then distilled under reduced pressure, the fraction boiling at 150–151° C. at 4 mm. of Hg pressure being collected.

Example XXXIII.—Di-(2-ethylhexyl) fumarate 196 grams of maleic anhydride, 780 grams 2-ethylhexyl alcohol, and 8 grams of p-toluene sulfonic acid were heated, with stirring, on the steam bath for 48 hours. 500 cc. of dry benzene were now added and the water formed during the reaction was removed azeotropically. 40 grams of water were thus removed. The benzene was distilled off and the oily residue was washed with water. The oil was taken up in ether and the ether solution was washed with sodium bicarbonate solution and then washed again with water. The ether solution was dried over anhydrous magnesium sulfate.

The ether solution was filtered and the filtrate distilled to remove ether. The oily residue was distilled under reduced pressure, the fraction boiling at 180–188° C. at 5 mm. of Hg pressure being collected. This was further purified by distillation in a high vacuum at 4–6 microns, the middle two-thirds of the distillate being saved.

By the term "alcohol radical" is meant a radical derived from an alcohol by dropping the OH group of the alcohol, e. g. benzyl from benzyl alcohol, β-chlorethyl from β-chlorethyl alcohol or secondary butyl from secondary butyl alcohol.

The specific viscosities given herein were determined from acetone solutions unless otherwise stated.

What we claim as our invention and desire to be secured by Letters Patent of the United States is:

1. A resinous copolymer of isopropenyl acetate and an ester selected from the group consisting of an ester of a monohydric alcohol and maleic acid and an ester of monohydric alcohol and fumaric acid, the molecular ratio of isopropenyl acetate to said ester in the copolymer being from 1:1.9 to 1:0.9.

2. A resinous copolymer of isopropenyl acetate and an ester of a monohydric alcohol and fumaric acid, the molecular ratio of isopropenyl acetate to said ester in the copolymer being from 1:1.9 to 1:0.9.

3. A resinous copolymer of isopropenyl acetate and an ester of a monohydric alcohol and maleic acid, the molecular ratio of isopropenyl acetate to said ester in the copolymer being from 1:1.9 to 1:0.9.

4. A resinous copolymer of isopropenyl acetate and an ester of a monohydric alcohol and a dialkyl maleate, the molecular ratio of isopropenyl acetate to said maleate in the copolymer being from 1:1.9 to 1:0.9.

5. A resinous copolymer of isopropenyl acetate and an ester of a monohydric alcohol and a dialkyl fumarate, the molecular ratio of isopropenyl acetate to said fumarate in the copolymer being from 1:1.9 to 1:0.9.

6. A process for preparing a resinous copolymer comprising heating, in the presence of a peroxide polymerization catalyst, a mixture of isopropenyl acetate and an ester selected from the group consisting of an ester of a monohydric alcohol and maleic acid and an ester of a monohydric alcohol and fumaric acid, the molecular ratio of isopropenyl acetate to said ester in acid mixture being from 1:2.3 to 1:0.4.

7. A process for preparing a resinous copolymer comprising heating, in the presence of a peroxide polymerization catalyst, a mixture of isopropenyl acetate and an ester of a monohydric alcohol and maleic acid, the molecular ratio of isopropenyl acetate to said ester in said mixture being from 1:2.3 to 1:0.4.

8. A process for preparing a resinous copolymer comprising heating, in the presence of a peroxide polymerization catalyst, a mixture of isopropenyl acetate and an ester of a monohydric alcohol and fumaric acid, the molecular ratio of isopropenyl acetate to said ester in said mixture being from 1:2.3 to 1:0.4.

9. A process for preparing a resinous copolymer comprising heating, in the presence of a peroxide polymerization catalyst, a mixture of isopropenyl acetate and a dialkyl maleate, the molecular ratio of isopropenyl acetate to said maleate in said mixture being from 1:2.3 to 1:0.4.

10. A process for preparing a resinous copolymer comprising heating, in the presence of a peroxide polymerization catalyst, a mixture of isopropenyl acetate and a dialkyl fumarate, the molecular ratio of isopropenyl acetate to said fumarate in said mixture being from 1:2.3 to 1:0.4.

11. A process for preparing a resinous copolymer comprising heating, in the presence of a peroxide polymerization catalyst, a mixture of isopropenyl acetate and dimethyl maleate, the molecular ratio of isopropenyl acetate to said maleate in said mixture being from 1:2.3 to 1:0.4.

12. A process for preparing a resinous copolymer comprising heating, in the presence of a peroxide polymerization catalyst, a mixture of isopropenyl acetate and diethyl fumarate, the molecular ratio of isopropenyl acetate to said fumarate in said mixture being from 1:2.3 to 1:0.4.

13. A process for preparing a resinous copolymer comprising heating, in the presence of a peroxide polymerization catalyst, a mixture of isopropenyl acetate and diisopropyl fumarate, the molecular ratio of isopropenyl acetate to said fumarate in said mixture being from 1:2.3 to 1:0.4.

14. A resinous copolymer of isopropenyl acetate and dimethyl maleate, the molecular ratio of isopropenyl acetate to dimethyl maleate in the copolymer being from 1:1.9 to 1:0.9.

15. A resinous copolymer of isopropenyl acetate and diethyl fumarate, the molecular ratio of isopropenyl acetate to diethyl fumarate in the copolymer being from 1:1.9 to 1:0.9.

16. A resinous copolymer of isopropenyl acetate and diisopropyl fumarate, the molecular ratio of isopropenyl acetate to diisopropenyl fumarate in the copolymer being from 1:1.9 to 1:0.9.

WILLIAM O. KENYON.
CORNELIUS C. UNRUH.

REFERENCES CITED

The following references are of record in the file of this patent:

UNITED STATES PATENTS

| Number | Name | Date |
|---|---|---|
| 1,945,307 | Dykstra | Jan. 30, 1934 |
| 2,326,287 | Coffmann | Aug. 10, 1943 |